Nov. 10, 1959 R. M. TILLMAN 2,912,653

SQUARE WAVE OSCILLATOR

Filed Jan. 28, 1957

INVENTOR.
ROBERT M. TILLMAN

BY Edward W. Hughes

ATTORNEY

United States Patent Office 2,912,653

Patented Nov. 10, 1959

2,912,653

SQUARE WAVE OSCILLATOR

Robert M. Tillman, Willow Grove, Pa., assignor to Burroughs Corporation, Detroit, Mich., a corporation of Michigan Application January 28, 1957, Serial No. 636,740

4 Claims. (Cl. 331—113)

This invention relates to square wave oscillators, and more particularly to a square wave oscillator employing solid state components.

The square wave oscillator disclosed herein is an improvement over four-winding transistor-magnetic square wave oscillators. The oscillator disclosed herein uses two windings on a magnetic core instead of the four windings taught by the prior art in transistor-magnetic square wave oscillators. Because of the novel arrangement of the components of the oscillator, the output voltage wave forms very closely approximate an accurate or ideal square wave, and the switchover or transition time of the output voltage wave forms are short. As a result of the short transition time, the efficiency of the oscillator is very high.

It is, therefore, an object of this invention to provide an improved square wave oscillator.

It is a further object of this invention to provide an improved square wave oscillator using solid state components and which has a very short switchover time.

It is a still further object of this invention to provide an improved transistor-magnetic square wave oscillator which is capable of producing substantially accurate square waves over a wide range of frequencies.

It is another object of this invention to provide an improved transistor-magnetic square wave oscillator, the output frequency of which is readily varied in a substantially linear manner.

Other objects and many of the attendant advantages of this invention will be readily appreciated as the same become better understood by reference to the following detailed description when considered in connection with the accompanying drawing.

Figure 1:
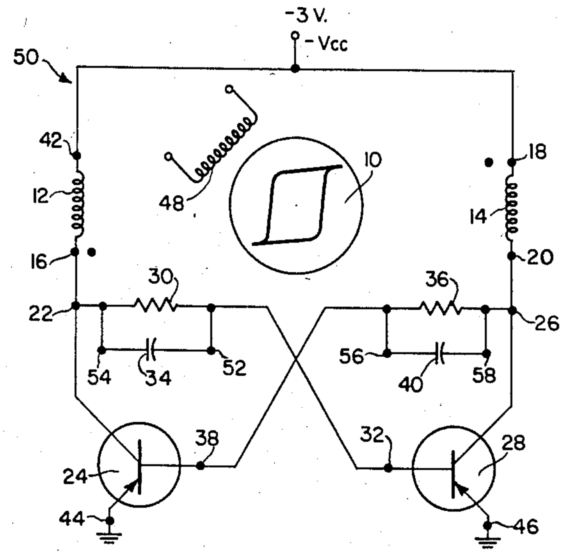
Fig. 1 is a schematic diagram of the square wave oscillator.

Referring to Fig. 1, core 10 is formed from a magnetic material. In a preferred example, the core was made from Molypermalloy ribbon wound on a nonmagnetic bobbin such as stainless steel. Reset winding 12 and set winding 14 are wound on core 10. Windings 12, 14 are bifilar and have the same number of turns. As a result, the magnetic coupling between windings 12, 14 is substantially unity.

In Fig. 1 each of the windings 12, 14 is indicated as having one of its two terminals dotted and the other undotted. It will be assumed hereafter that the direction in which windings 12, 14 are wound on core 10 is such that an increase in conventional electrical current flowing into dotted terminal 16 of winding 12, for example, will induce an E.M.F. in winding 14 such that the dotted terminal 18 of winding 14 is positive with respect to its undotted terminal 20. An increase in conventional electrical current flowing out of dotted terminal 18 will induce an E.M.F. in winding 12 such that dotted terminal 16 is negative with respect to its undotted terminal.

Dotted terminal 16 of reset winding 12 is directly connected to collector terminal 22 of transistor 24; undotted terminal 20 of set winding 14 is directly connected to collector terminal 26 of transistor 28. Terminals 16, 22 are connected by base resistor 30 to base terminal 32 of transistor 28; base resistor 30 is shunted by capacitor 34. Terminals 20, 26 are connected by base resistor 36 to base terminal 38 of transistor 24; base resistor 36 is shunted by capacitor 40. Undotted terminal 42 of reset winding 12 and dotted terminal 18 of set winding 14 are connected to the negative terminal of a suitable source of collector potential, $V_{cc}$, which is not illustrated. Emitter terminals 44, 46 of transistors 24, 28 are connected to a point at reference potential, normally ground potential. An output signal may be obtained from look, or output, winding 48 wound on core 10. Transistors 24, 28 are illustrated as being p–n–p transistors, preferably junction transistors of the alloy, grown, or surface barrier type.

It is possible to design circuits using p–n–p junction transistors in the common emitter configuration so that a transistor will saturate, bottom, or be conducting heavily, if the potential of its base with respect to its emitter is equal to or more negative than −0.3 v. and so that the transistor will be substantially biased off, cut off, or substantially not conducting, if the potential of its base with respect to its emitter is approximately −0.1 v., or more positive. In such circuits the potential of the collector of a bottomed, or be conducting heavily, transistor will be approximately −0.1 v., or more positive, with respect to its emitter, which potential when applied to the base of a transistor in a similar configuration, is sufficient to cut off said transistor. These voltages obviously may vary depending upon the characteristics of each transistor, as is well known in the art. N–p–n transistors may be substituted for p–n–p transistors illustrated provided the polarities of the supply potentials are reversed.

In Fig. 1 transistors 24, 28 are parts of two amplifying circuits with transistors 24, 28 each being in the common emitter configuration. Winding 12 is the load element, collector 22 is the output terminal, and base 38 is the input terminal of the amplifier circuit which includes transistor 24. Winding 14 is the load element, collector 26 is the output terminal, and base 32 is the input terminal of the amplifier circuit which includes transistor 28. The input and output terminals of the two circuits are cross-coupled by two parallel resistor-capacitor networks, one circuit consisting of resistor 30 and capacitor 34 and the other consisting of resistor 36 and capacitor 40.

Oscillator 50 will start to oscillate whenever terminals 42, 18 of windings 12, 14 are connected to a suitable source of supply potential, $V_{cc}$, since $V_{cc}$ is directly applied to bases 38, 32 of transistors 24, 28. Although the values and/or characteristics of the corresponding components of the oscillators are substantially the same, the voltage of the base of one transistor will be more negative than the base of the other transistor shortly after the collector supply potential is initially applied to the circuit. For example, if base 32 becomes slightly more negative than base 38 an instant after $V_{cc}$ is connected to terminals 42, 18, then transistor 28 will conduct more heavily than transistor 24. The increase in collector current flowing through set winding 14 creates a positive magnetomotive force which drives core 10 toward its positive saturation state $+B_s$, and this increase in flux density induces a regenerative E.M.F. in reset winding 12. The regenerative E.M.F., or voltage, causes terminal 16 to become negative with respect to terminal 42. The change in potential of terminal 16 is coupled by base resistor 30 to base 32 of transistor 28, causing base 32 to become sufficiently negative to cause transistor 28 to conduct heavily, or bottom, quickly.

By the proper choice of the circuit parameters, the regenerative voltages induced in windings 12, 14 can be made substantially equal to Vcc, or more accurately approximately 0.1 v. less than, the magnitude of the supply potential, Vcc. In order for the E.M.F. induced in winding 12 to be substantially equal to Vcc, it is necessary for the current flowing through set winding 14 to increase rapidly and continuously after the magnetizing force H has increased past the knee of the hysteresis loop of core 10. However, a time is reached when transistor 28 can no longer supply the required increase in current to keep the rate of change of the magnetic flux density B substantially constant. When this occurs, the voltage induced in the collector winding 12 and the back E.M.F. in winding 14 decrease. The decrease in potential induced in winding 12 is amplified by transistor 28 so that the current flowing through winding 14 decreases very rapidly.

During the time transistor 28 is bottomed, the base current drawn by transistor 28 creates a sizable voltage drop across resistor 30. Capacitor 34 charges so that terminal 52 is positive with respect to terminal 54. By knowing the desired band of operating frequencies and by the proper choice of values for resistor 30 and capacitor 34, the voltage across capacitor 34 will build up after a few cycles of operation so that the voltage across it is only slightly less than twice the collector supply potential, Vcc.

As soon as the collector current flowing through winding 14 begins to decrease, the flux density decreases from its positive saturation state $+B_s$ toward its positive remanence state $+B_r$. The change in flux induces a flyback voltage or pulse in windings 12, 14. As a result of the flyback voltages, the potential of collector 26 becomes nearly equal to −2 Vcc, which potential is applied through base resistor 36 to base 38 of transistor 24, and momentarily collector 22 of transistor 24 is driven positive. When the flyback pulse terminates, the potential of collector 22 goes negative and transistor 24 bottoms. Flow of the collector current of transistor 24 through reset winding 12 creates a negative magnetomotive force, and the resulting change in magnetic flux density is such as to induce a regenerative voltage in winding 14, which voltage maintains transistor 24 bottomed until the core reaches its negative saturation state $-B_s$. The magnitudes of resistors 30, 36 are made substantially equal, as are the magnitudes of capacitors 34, 40. Thus after a few cycles of operation, capacitor 40 will become charged as a result of the base current drawn by transistor 24 when bottomed. The charge on capacitor 40 will be slightly less than twice the collector supply potential Vcc with terminal 56 positive with respect to terminal 58.

Figure 2:
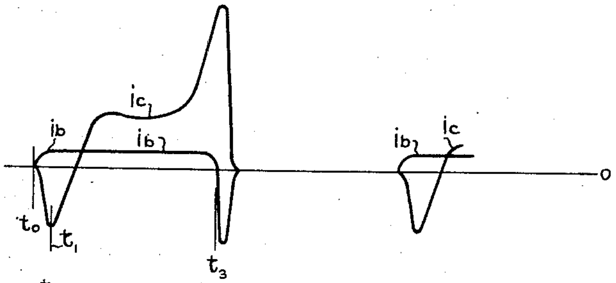
Fig. 2 is a graph approximately to scale of the collector and base currents of one transistor of the oscillator plotted against time.
Figure 3:
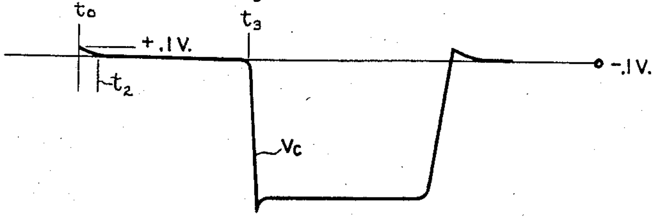
Fig. 3 is a graph approximately to scale of the collector potential of one transistor of the oscillator plotted against time.
Figure 4:
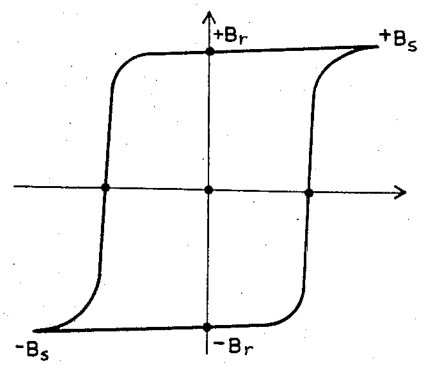
Fig. 4 is an idealized hysteresis loop of a magnetic core.

The wave forms of Figs. 2 and 3 describe the operation of the oscillator after capacitors 34, 40 have become charged. At time $t_0$ the potential of collector 26 of transistor 28, for example, goes momentarily positive as a result of the flyback voltage induced in winding 14 as the collector current of transistor 24 decreases. At the same time, base 32 of transistor 28 goes negative with respect to emitter 46 and collector 26 since the sum of the flyback pulse induced in winding 12 and Vcc is greater than the potential across capacitor 34. With collector 26 positive, base 32 negative, and emitter 46 at ground, transistor 28 will conduct heavily, or bottom, however, not in the normal manner, as collector 26 is, under these circumstances functioning as an emitter and emitter 46 is functioning as a collector. This inverse action of transistor 28 accounts for the negative pulse of the collector current $i_c$, which has its maximum value at time $t_1$ in Fig. 2. This inverse bottoming of transistor 28 preconditions transistor 28, where preconditioning means that the hole density of base 32 is increased. Therefore, when the potential of collector 26 goes negative at time $t_2$, transistor 28 bottoms in the normal manner without the usual turn on or delay time caused by the need to charge the base emitter junction capacitance before junction current can flow.

The collector current $i_c$ changes as indicated in Fig. 2. Initially the collector current of transistor 28 increases at a rapid rate from its negative maximum value toward 0 while core 10 is being driven by the rapid decrease in collector current of transistor 24 from its negative saturation region $-B_s$ toward its negative remanence state $-B_r$. The rate of rise of $i_c$ of transistor 28 toward 0 is governed mainly by the inductance parameter of winding 14 while core 10 is saturated and by the voltage which exists across winding 14 at this time. When the collector current reaches 0, core 10 is still saturated beyond remanence because of the base current of transistor 28 flowing through winding 12. By this time transistor 28 has been preconditioned, as described above, and the base current $i_b$ is flowing at full value. Thus a normally directed $i_c$ flows in the collector circuit of transistor 28 without delay when the collector 26 goes negative at time $t_2$. When the collector current equals the base current $i_b$, the core reaches its negative remanence state. From this time on the core switches in a normal fashion toward its positive remanence state $+B_r$. This produces collector current of transistor 28 can no longer increase.

As soon as this point is reached, the induced E.M.F. in winding 12 and the back E.M.F. in winding 14 drop quickly in magnitude toward 0. The decrease in induced E.M.F. in winding 12 causes base 32 of transistor 28 to go positive because of the voltage across capacitor 34. When base 32 of transistor 28 goes positive beginning at time $t_3$, the base-to-emitter junction of transistor 28 is heavily biased in the reverse direction and a negative pulse of base current $i_b$ flows, as seen in Fig. 2. This inverse base-to-emitter current causes transistor 28 to rapidly cut off by removing the current carriers from the base region.

The rapid decrease of $i_c$ when base 32 goes positive drives core 10 from its positive saturation state $+B_s$ toward its postive remanence state $+B_r$. This produces a rapid change in the flux density of core 10, which in turn induces flyback voltages in windings 12, 14. The magnitudes of the flyback voltages induced in windings 12, 14 could be several times larger than the supply voltage Vcc. However, they are limited to being only slightly greater than Vcc because as soon as the flyback voltage exceeds Vcc in magnitude, it drives collector 22 of the off transistor 24 slightly positive and causes collector 26 of transistor 28 to go sufficiently negative so that base 38 of transistor 24 becomes negative in spite of the positive voltage across capacitor 40. This causes transistor 24 to bottom in the inverse manner with collector 22 functioning as an emitter and emitter 44 functioning as a collector. Transistor 24 functions in this inverse manner at the same time that transistor 28 is being forcibly cut off as a result of its base being driven positive by the flyback pulse and the charge on capacitor 34. When transistor 24 bottoms in the inverse manner, its collector 22 is clamped substantially at ground potential, or more accurately at a potential of between +0.1 v. and ground.

The low impedance between emitter 44 and collector 22 of inversely bottomed transistor 24 permits the energy represented by the change in flux density as core 10 is driven from $+B_s$ toward $+B_r$ in excess of that supplied by the transistor 24 to be dissipated. As soon as the flyback voltage pulse has been dissipated, a matter of a few tenths of a microsecond, the flyback voltages induced in windings 12, 14 decrease so that collector 22 becomes slightly negative. Transistor 24 then bottoms in its normal manner and is kept bottomed as a result of the regenerative voltage induced in winding 14; however, the delay time of transistor 24 is substantially eliminated because base 38 of transistor was preconditioned; i.e., its hole density increased while transistor 24 was bottomed in the inverse manner. The collector current of transistor 24 increases and the magnetomotive force due to its collector current flowing through reset winding 12 drives core 10 to its negative saturation point $-B_s$.

When core 10 reaches its negative saturation state $-B_s$, transistor 24 starts to cut off because the regenerative voltage induced in winding 14 decreases, and as a result, base 38 goes positive because of the charge across capacitor 40. While the collector current of transistor 24 is being driven back toward 0 by the large positive potential of base 38, the flyback voltages induced in windings 12, 14 drive collector 26 of transistor 28 slightly positive and its base 32 slightly negative in spite of the charge stored on capacitor 34. As a result, transistor 28 will bottom in the above-mentioned inverse manner. This dissipates the energy represented by the change in the magnetic state from $-B_s$ to $-B_r$, and at the same time preconditions transistor 28 so that at the end of the flyback pulse, when collector 26 goes negative, transistor 28 bottoms in the normal manner without the normal transition period or delay.

In one embodiment, the components were of the following types and/or had the following values:

| | |
|---|---|
| Resistor **30**, **36** | 1 K ohm. |
| Capacitor **34**, **40** | .055 microfarad. |
| Transistor **24**, **28** | SB–100's. |
| Core **10** | .045 micro-Webers, Molypermalloy. |
| Winding **12**, **14** | 30 turns (each). |
| Vcc | 3.0 volts. |

The above embodiment operates at a frequency of substantially 700 kilocycles, at which time the switchover time is 0.06 microsecond. Oscillators as taught herein can be designed to operate at frequencies ranging from the low audio range up to substantially 1 megacycle with the presently available transistors. The actual operating frequency range of a given oscillator depends upon the number of turns of windings 12, 14, the material from which core 10 is made and its cross-sectional area, the magnitude of V*cc*, the size of resistors 30, 36 and capacitors 34, 40, and the characteristics of the transistors used. The values and/or types of components and the voltages specified above are included by way of example only as being suitable for the device illustrated. It is to be understood that the circuit specifications in accordance with the invention may vary with the design for any particular application.

When core 10 is made from a magnetic material having a substantially square hysteresis loop, the total switching flux of the core is substantially constant so long as the temperature of the core is kept substantially constant. The collector-to-emitter resistance of a bottomed transistor is also constant, as is the number of turns of each winding. As a result, the frequency of the oscillator is substantially a linear function of the applied voltage Vcc.

Obviously many modifications and variations of the present invention are possible in the light of the above teachings. It is, therefore, to be understood that within the scope of the appended claims, the invention may be practiced other than as specifically described and illustrated.

What is claimed is:

1. A square wave oscillator comprising a core made of ferromagnetic material and having a substantially square hysteresis loop, a set winding and a reset winding bifilarly wound on said core, each of said windings having substantially the same number of turns and two terminals, a first and a second junction transistor having substantially similar characteristics, each transistor having a base, a collector, and an emitter, one terminal of the reset winding being connected to the collector of the first transistor and one terminal of the set winding being connected to the collector of the second transistor, a first base resistor connecting the collector of the first transistor to the base of the second transistor, a first capacitor shunting said first base resistor, a second base resistor connected between the collector of the second transistor and the base of the first transistor, a second capacitor shunting the second base resistor, and circuit means connected to the other terminals of the set and reset windings for connecting to a suitable source of collector potential.

2. A square wave oscillator comprising a core made of ferromagnetic material, a first and a second winding bifilarly wound on said core, each of said windings having substantially the same number of turns and two terminals, a first and a second junction transistor having substantially similar characteristics, each transistor having a base, a collector, and an emitter, circuit means connecting the collector of the first transistor to one of the terminals of the first winding, circuit means connecting the collector of the second transistor to one of the terminals of the second winding, a first base resistor connecting the collector of the first transistor to the base of the second transistor, a first capacitor shunting said first base resistor, a second base resistor connected between the collector of the second transistor and the base of the first transistor, a second capacitor shunting the second base resistor, circuit means connected to the other terminal of the first winding and to the other terminal of the second winding for connecting to a suitable source of collector potential, said first winding being wound on said core so that normal collector current of the first transistor flowing through the first winding, produces a magnetomotive force of one polarity, and said second winding being wound on said core so that normal collector current of the second transistor flowing through the second winding produces a magnetomotive force of the other polarity.

3. An oscillator comprising a magnetic core having two saturated magnetic states, said core having a first and a second winding, a first transistor amplifier circuit and a second transistor amplifier circuit, the transistor of each amplifier circuit being in the common emitter configuration and having substantially the same characteristics, each transistor having an emitter, a base, and a collector, the first winding being in the collector circuit of the transistor of the first amplifier circuit and the second winding being in the collector circuit of the transistor of the second amplifier circuit, said first amplifier circuit, when its transistor is conducting, driving said core toward one of its saturated states, said second amplifier circuit, when its transistor is conducting, driving said core toward the other of its saturated states, a first parallel resistor-capacitor network coupling the collector of the first transistor to the base of the second transistor, and a second parallel resistor-capacitor network coupling the collector of the second transistor to the base of the first transistor.

4. An oscillator comprising a core made of substantially square loop magnetic material and having two saturated magnetic states, a first and a second winding on said core, each of said windings having two terminals, a first and a second transistor, each transistor having a base, a collector, and an emitter, circuit means connecting the collector of the first transistor to one terminal of the first winding, means connecting the collector of the second transistor to one terminal of the second winding, the terminal of the first winding which is connected to the collector of the first transistor being chosen so that normal collector current flowing through the first winding drives the core toward one of its saturated magnetic states, and the terminal of the second winding which is connected to the collector of the second transistor being chosen so that the normal collector current flowing through the second winding drives the core toward the other of its saturated magnetic states, a first resistor-capacitor network connecting the collector of the first transistor to the base of the second transistor, a second resistor-capacitor network connecting the collector of the second transistor to the base of the first transistor, circuit means connected to the other terminals of said first and second windings for connecting to a source of collector potential, additional circuit means connected to the emitters of said transistors for connecting to a point at reference potential, and an output winding on said core.

References Cited in the file of this patent

UNITED STATES PATENTS 2,759,104 Skellett ---------------- Aug. 14, 1956

OTHER REFERENCES

Article: "Transistors as On-Off Switches in Saturable-Core Circuits," by Bright et al. pages 79–82 of "Electrical Manufacturing," for Dec. 1954.

UNITED STATES PATENT OFFICE

CERTIFICATE OF CORRECTION

Patent No. 2,912,653 November 10, 1959

Robert M. Tillman

It is hereby certified that error appears in the printed specification of the above numbered patent requiring correction and that the said Letters Patent should read as corrected below.

Column 5, line 33, for ".055 microfarad" read -- .005 microfarad --.

Signed and sealed this 12th day of July 1960.

(SEAL)
Attest:

KARL H. AXLINE
Attesting Officer

ROBERT C. WATSON
Commissioner of Patents